United States Patent [19]
Ho et al.

[11] Patent Number: 5,428,741
[45] Date of Patent: Jun. 27, 1995

[54] HIGH SPEED IMAGE PREPROCESSING SYSTEM INCLUDING A MULTI-PURPOSE BUFFER FOR STORING DIGITAL IMAGE DATA AND DATA CROPPING MEANS FOR SELECTIVELY CROPPING THE DIGITAL IMAGE DATA

[75] Inventors: Benedict C. M. Ho, Waterloo; Thomas S. Craig, Kitchener, both of Canada

[73] Assignee: NCR Corporation, Dayton, Ohio

[21] Appl. No.: 96,811

[22] Filed: Jul. 26, 1993

[51] Int. Cl.[6] .............................................. G06F 15/00
[52] U.S. Cl. ..................................... 395/162; 395/164
[58] Field of Search ................................ 395/162–164, 395/425, 250, 157; 364/DIG. 1, DIG. 2; 382/41, 56; 345/185, 196, 201, 202

[56] References Cited

U.S. PATENT DOCUMENTS

| | | | |
|---|---|---|---|
| 4,817,175 | 3/1989 | Tenebaum et al. | 382/41 |
| 4,860,375 | 8/1989 | McCubbrey et al. | 382/49 |
| 4,864,532 | 9/1989 | Reeve et al. | 395/250 |
| 4,905,184 | 2/1990 | Giridhar et al. | 364/900 |
| 5,191,581 | 3/1993 | Woodbury et al. | 395/275 |

Primary Examiner—Mark R. Powell
Assistant Examiner—Kee M. Tung

[57] ABSTRACT

A system for use in image recognition applications to reduce the processing demands on the associated Host Computer thus allowing for greater system throughput. Compressed image data is transmitted over a Small Computer System Interface (SCSI) for storage in a Multi-Purpose Buffer. The data may decompressed, byte-swapped, byte-flipped, or may be passed through the system unmodified as directed by the Host Computer. A Video Compression-Expansion Processor can handle a variety of data compression formats and receives data from the Multi-Purpose Buffer. Processed data which matches preprogrammed sets of window coordinates can be selectively cropped and stored in multiple First-In-First-Out (FIFO) buffers by Cropper Controller circuitry. The processed and cropped data is then sent to the Host Computer through a Micro-Channel Architecture (MCA) Interface Controller for further recognition processing by the Host Computer. A high data throughput rate is achieved by synchronizing data transfer among the components of the preprocessing system by use of the Multi-Purpose Buffer and a data window storage mechanism.

16 Claims, 7 Drawing Sheets

HIGH SPEED IMAGE PREPROCESSING SYSTEM INCLUDING A MULTI-PURPOSE BUFFER FOR STORING DIGITAL IMAGE DATA AND DATA CROPPING MEANS FOR SELECTIVELY CROPPING THE DIGITAL IMAGE DATA

The present invention relates to the field of digital image data processing and, more particularly, to a high speed image preprocessing system capable of processing a stream of digital data so that the workload of an associated host computer is reduced.

BACKGROUND OF THE INVENTION

Image recognition technology is becoming widely used in manufacturing, commercial, and business applications. Such applications include: verification of objects on assembly lines, locating bonding pads on integrated circuits, visual robotic control systems, optical character recognition, and document verification and classification devices.

Typical image recognition systems known in the art receive data through a data communications link and transmit the data to various recognition boards for processing by a host computer. Typically, in optical character recognition systems, image data files are captured and compressed by image capture platforms and devices. The image data files are then sent to a recognition system to decompress the data and perform image recognition within a pre-defined subset or window of the image.

Image data recognition is a computation intensive task and presents a formidable challenge to the host computer. The limited success of prior art systems that use general purpose computers to perform pattern analysis and image recognition is due to the extremely long processing times required to process images with a large number of data points. The massive amount of data to be analyzed and processed cause many computer systems to be slow and incapable of meeting the data throughput requirements. These complex real time processing demands call for computational throughputs that exceed those of devices used in the prior art.

There is a need for a high speed image preprocessing system which can off-load various tasks from the host recognition system so that a higher system recognition throughput is achieved.

OBJECT OF THE INVENTION

It is therefore an object of the present invention to provide an improved means of preprocessing digital image data.

It is another object of the present invention to provide such a digital image preprocessing system with a data communications link for transferring data between external devices and a host computer.

It is another object of the present invention to provide such a digital image preprocessing system such that the computational workload of the host computer is reduced by selectively cropping the digital image data.

It is yet another object of the present invention to provide a digital image preprocessing system capable of compressing and decompressing data and capable of controlling the flow of multiple data image portions through the image preprocessing system.

It is a still further object of the present invention to provide such a digital image preprocessing system wherein performance throughput is improved by operating preprocessing system stages in parallel.

It is still a further object of the present invention to provide a single card for use within a Micro Channel Architecture environment capable of an alternate assembly such that when certain components remain uninstalled, the card provides only a data communications link function.

SUMMARY OF THE INVENTION

A high speed digital image preprocessing system connected between a data link and a host computer interface bus comprising a digital multi-purpose buffer for storing digital image data where the image data is comprised of digital image words; a video processor connected to receive the digital image data from the digital multipurpose buffer; a data link interface controller to direct the flow of digital image data to and from the data link; a multi-purpose buffer controller for providing signals to control the flow of digital image data between the digital multi-purpose buffer, data link, video processor, and the host computer interface bus; a data cropping controller connected to receive a plurality of preprogrammed window coordinates such that the digital image data processed by the video processor which matches the preprogrammed window coordinates is identified; a host computer interface means to direct the flow of digital image data to and from the host computer interface bus; and a window data storage means connected to receive the identified digital image data from the video processor and connected to send the identified digital image data to the host computer interface means.

The task of the host computer is to recognize images within a set of data. The present invention acts as a peripheral which attaches to a data link on one side and to a host computer on the other side. The data link is typically a Small Computer System Interface (SCSI) link that receives image data from various application devices (capture platforms) that are connected to the SCSI link. However the present invention is not limited to the use of a SCSI link and any suitable data communications link may be substituted.

The image data is then processed by the image preprocessing system and the resulting data is transferred to the host computer for final recognition and processing. The image preprocessing system can perform data compression or decompression, byte swapping, and bit flipping as required by the host computer. Additionally, the image preprocessing system can crop multiple windows of data bounded by given sets of coordinates and is able to send these subsets of data to the host computer for further image processing, such as recognition processing.

The present invention is relevant in a variety of applications including check processing devices, flat-bed scanners, or any other application requiring image recognition capability. In the described embodiment, the invention is a board-resident system housed within a Micro Channel® Architecture (MCA) host computer (Micro Channel is a registered trademark of IBM Corporation), and connected to a SCSI link. The invention incorporates a Multi-Purpose Buffer, a Multi-Purpose Buffer Controller, a Small Computer System Interface (data communications link), a Video Compression/Expansion Processor, a Cropper Controller, Cropper First-In-First-Out (FIFO)/Window Storage memories, a Micro-Channel Architecture Interface Controller,

DETAILED DESCRIPTION OF THE PREFERRED EMBODIMENT

1. OVERVIEW

Figure 1:
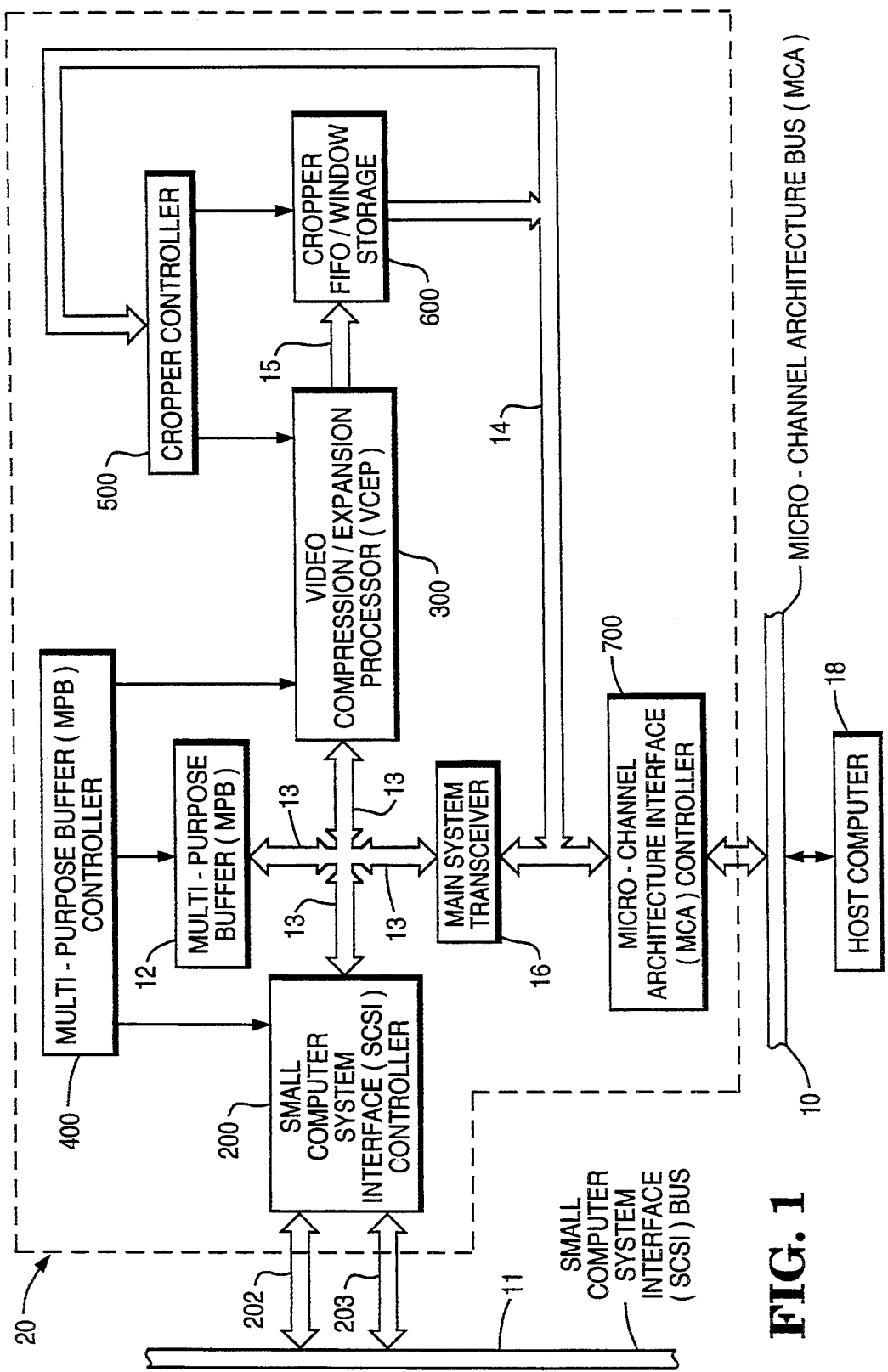
FIG. 1 is a block diagram of the major components of the system of the preferred embodiment of the present invention.

Referring now to FIG. 1, there is seen a block diagram incorporating a Multi-Purpose Buffer (MPB) 12, a MPB Controller 400, a Small Computer System Interface SCSI controller 200, a Video Compression/Expansion Processor (VCEP) 300, a Cropper Controller 500 and associated Cropper First-In-First-Out (FIFO)/Window storage memory devices 600, a Micro-Channel Architecture (MCA) Interface Controller 700, and a Main System Transceiver 16.

During normal operation, data enters the image preprocessing system 20 through the SCSI controller 200. Depending upon the application, as will be described in greater detail below, data may be directed to the host computer 18 in pass-through mode, wherein no preprocessing activity occurs, or data may be directed to the MPB 12. Data stored in the MPB 12 is transferred to the VCEP 300 for compression or decompression as the first step in preprocessing. Once the data has been compressed or decompressed as required by the host computer, the Cropper Controller 500 selectively crops data which matches a pre-programmed set of window coordinates and saves the cropped window data in the Cropper FIFO/Window Storage 600 for subsequent transfer to the host computer. Two independent windows can be processed by the Cropper Controller 500 and functions such as byte swapping and bit flipping may be performed as initial preprocessing steps as required by the data format. Finally, data is transferred from the Cropper FIFO/Window Storage 600 to the MCA Interface 700, to the MCA bus 10, and on to the Host Computer 18.

Data can also enter the Preprocessing System 20 directly from the Host Computer 18 during normal operation or for the execution of self-test and diagnostic functions. The Host Computer 18 can transfer data directly into the MPB 12 or into the VCEP 300 depending upon the application. Data can then be manipulated and checked at various points in the system to isolate or verify the operation of selected components.

2. SYSTEM DATA BUS

Referring to FIG. 1, there is shown the System Data Bus 13 that interconnects the SCSI Controller 200, VCEP 300, Main System Transceiver 16, and the MPB 12. The System Data Bus 13 is a sixteen bit wide bi-directional data bus that functions to interconnect major components of the Image Preprocessing System 20. The connection between the sixteen bit wide system data bus 13 and the eight bit wide data bus 17 of the SCSI controller 200 is described later in the Small Computer System Interface (Section 3 below). The System Data Bus 13 is essentially multiplexed between the MPB 12, SCSI controller 200, VCEP 300, and the Main System Transceiver 16 to optimize pipelining and maximize data throughput.

The MPB Controller 400 controls access to the System Data Bus 13 and allows the SCSI controller 200 to transfer data into the MPB 12 at a maximum rate of 4 megabytes per second while the VCEP 300 is receiving data at a maximum rate of 8 megabytes per second. When the Host Computer 18 desires access to the System Data Bus 13 through the Main System Transceiver 16, the SCSI controller 200 and the VCEP 300 are denied access to the MPB 12 for the duration of Host Computer 18 access.

3. SMALL COMPUTER SYSTEM INTERFACE

Figure 2:
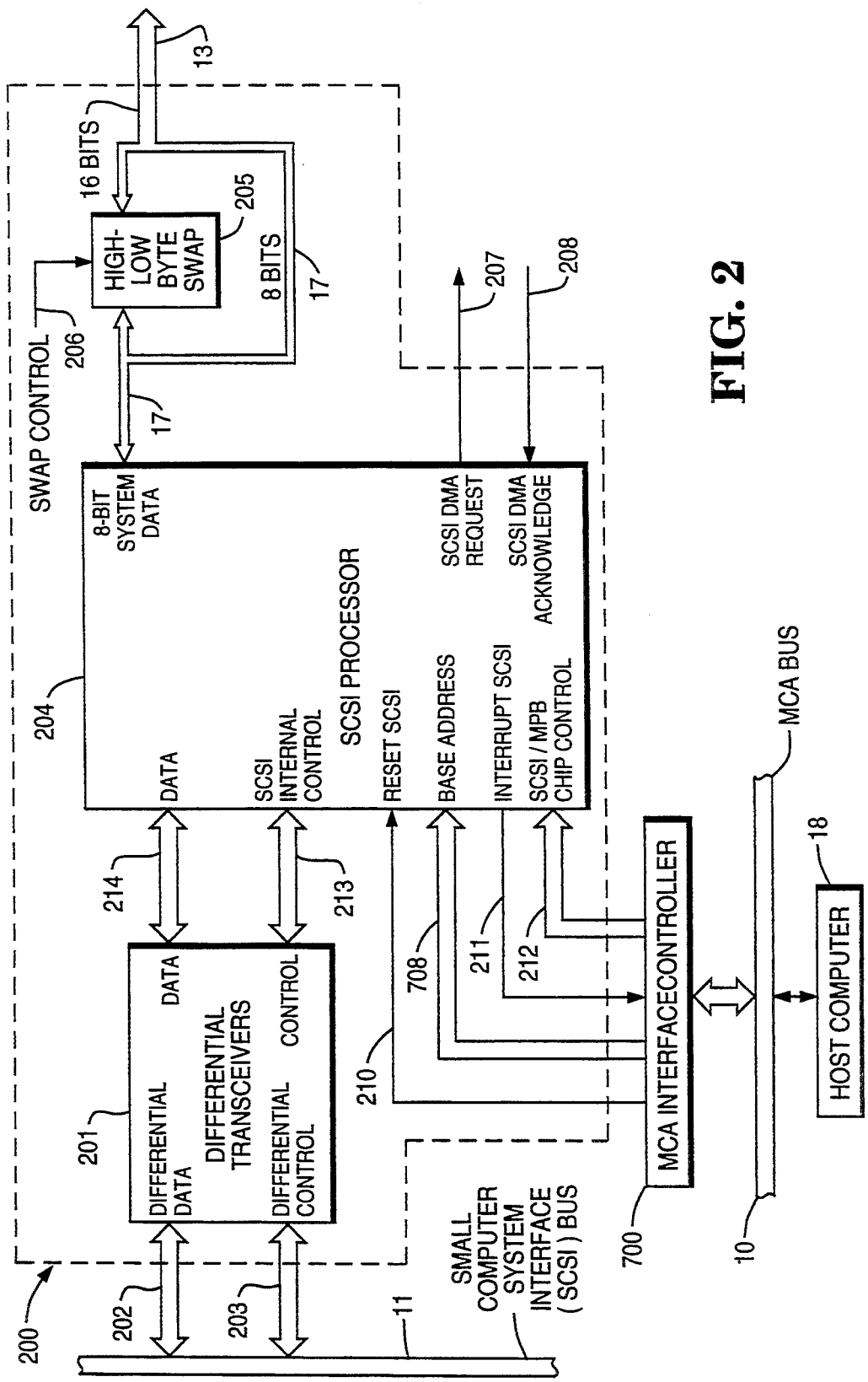
FIG. 2 is a detailed block diagram (200 of FIG. 1) of the Small Computer System Interface that incorporates Differential Transceivers.

Referring to FIG. 2, the SCSI controller 200 block is comprised of the SCSI Processor 204, Differential Transceivers 201, and a High-Low Byte Swap circuit 205. The Differential Transceivers 201 convert SCSI Bus 11 data to standard logic levels for subsequent processing by the SCSI Processor 204 while the High-Low Byte Swap circuit 205 couples the eight bit wide SCSI data bus 17 with the sixteen bit wide System Data Bus 13.

The SCSI controller 200 provides an efficient and standardized method to transfer data between various image capture platforms connected to the SCSI bus 11 and the Image Preprocessing System 20 (FIG. 1). The SCSI controller 200 represents technology that is well known in art and can be readily understood by one skilled in the art. For example, the SCSI can be implemented using NCR part No. 006-2001135 (53C90A). For a more complete reference see *SCSI: Understanding the Small Computer System Interface*, NCR Corporation (1990).

Referring to FIG. 2, external data enters the SCSI controller 200 through the SCSI Bus 11 and is received along Differential Data Bus 202. The differential data is converted into digital logic levels by tri-state bi-directional Differential Transceivers 201. The converted digital data is passed to the SCSI processor 204 along the SCSI Internal Data Bus 214. The SCSI processor 204 will then send and receive eight bit data through the High-Low Byte Swap circuit 205 for connection to the System Data Bus 13.

Figure 4:
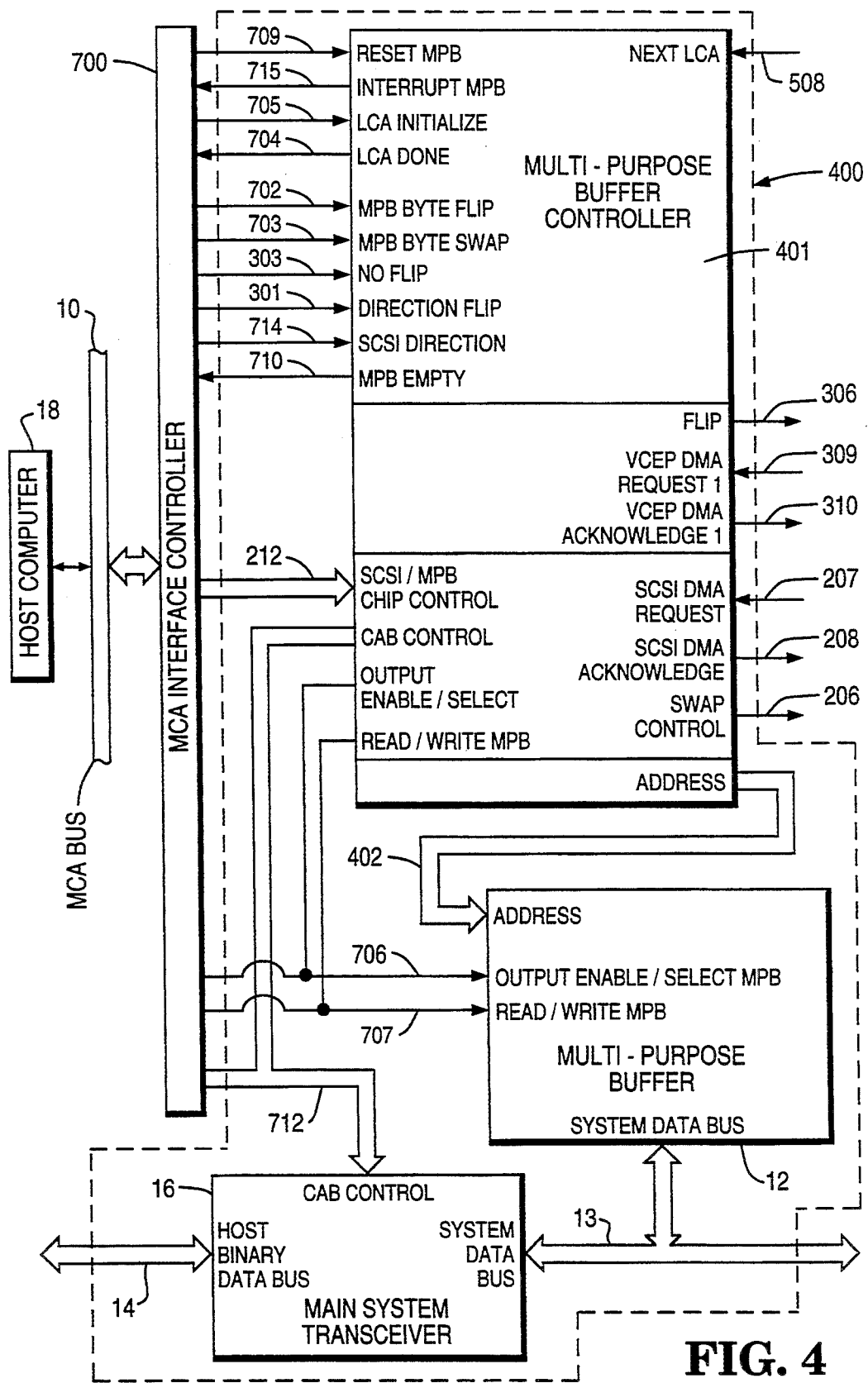
FIG. 4 is a detailed block diagram (400 of FIG. 1) of the digital Multi-Purpose Buffer (MPB), MPB Controller, and Main System Transceivers.

Still referring to FIG. 2, the High-Low Byte Swap circuit 205 is controlled by Swap Control signal 206 issued by the MPB Controller 401 (FIG. 4). The Swap Control signal 206 causes the High-Low Byte Swap circuit 205 to selectively place an eight bit data byte onto the upper half of the sixteen bit wide System Data Bus 13. Since the SCSI Controller 204 can directly place data on the lower half of the System Data Bus 13 and the High-Low Byte-Swap circuit 205 can place data from the SCSI Controller 204 onto the upper half of the System Data Bus 13, compatibility between the eight bit wide data path 17 of the SCSI Controller 204 and the sixteen bit wide System Data Bus 13 is achieved.

The Main System Transceiver 16 (FIG. 1) connects the System Data Bus 13 with the Host Binary Data Bus 14. In this way, data entering the SCSI controller 200 can be placed on the System Data Bus 13, through the Main System Transceiver 16 (FIG. 1), and on to the Host Binary Data Bus 14 (FIG. 1) to perform a flexible population mode data transfer (See Section 8—Low Cost Flexible Population Mode). This mode of operation allows data to be directly transferred between the SCSI link 200 (FIG. 1) and the Host Computer 18 (FIG. 1) when preprocessing circuits and preprocessing functions are not required.

The SCSI circuit 200 can transfer data by means of a high speed direct memory access (DMA) channel without the need for direct Host Computer 18 intervention. The SCSI processor 204 utilizes DMA techniques that are well known in the art to perform data transfers.

Figure 7:
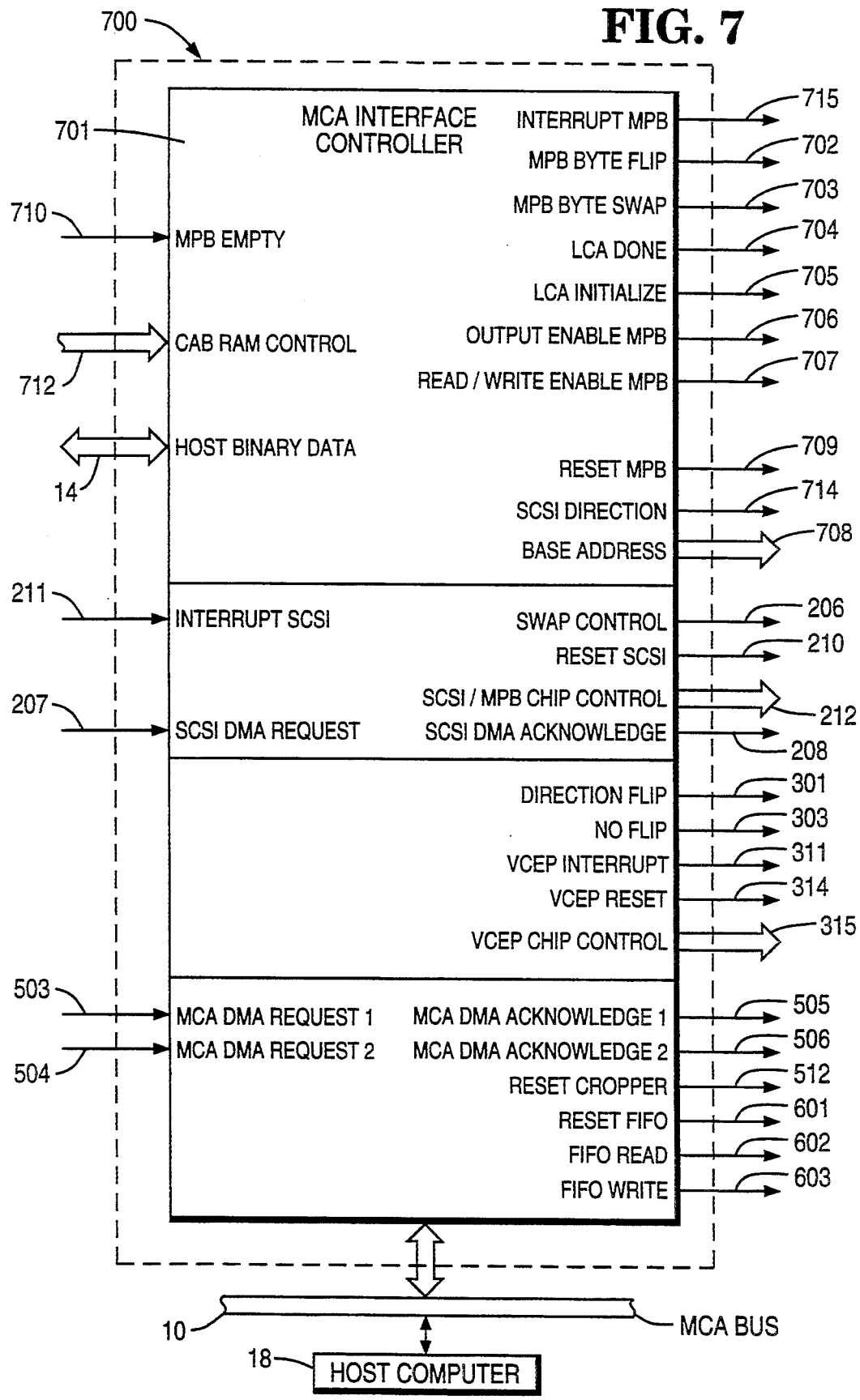
FIG. 7 is a detailed block diagram (700 of FIG. 1) of the Micro-Channel Architecture Interface Controller and connection to the host MCA bus.

Signal SCSI DMA request 207 is asserted by the SCSI processor 204 and is received by both the MPB Controller 401 (FIG. 4) and the MCA Interface Controller 700 (FIG. 7). Either the MPB Controller 401 (FIG. 4) or the MCA Interface Controller 700 (FIG. 7) can act as master devices under control of Host Computer 18, while the SCSI Processor 401 acts as a slave device.

Still referring to FIG. 2, the SCSI DMA Request signal 207 informs either master device to which it is connected that a data transfer is about to occur. Similarly, signal SCSI DMA Acknowledge 208 is asserted by either master device (MPB Controller 401 (FIG. 4) or MCA Interface Controller 700 (FIG. 7)) to initiate a DMA transfer. The SCSI/MPB Chip Control signals 212 connected between the SCSI Processor 204 and the MCA Interface Controller 700 provide the means by which the SCSI Processor 204 is programmed. Additionally, these signals 212 control whether a DMA data read or a DMA data write is to be initiated.

When the MCA Interface Controller 700 is the master device and the SCSI Processor 204 is the slave device, the MCA Interface Controller 700 will control whether DMA data is read from or written to the MCA Interface Controller 700 and ultimately to the Host Computer 18. Similarly, when the MPB Controller 401 (FIG. 4) is the master device and the SCSI Processor 204 is the slave device, the MPB Controller 401 (FIG. 4) will control whether DMA data is read from or written to the MPB 12 (FIG. 4). The MPB Controller 401 (FIG. 4) may direct the SCSI Processor 204 to read data directly from the SCSI Bus 11 into the MPB 12 (FIG. 4), or it may direct the SCSI Processor 204 to write data to the SCSI Bus 11 which was received from the MPB 12 (FIG. 4)

Note that the SCSI Processor 204 can transfer data through DMA techniques described above or, alternatively, MCA Interface Controller 700 can effectuate the transfer of data through single byte data reads and data writes by using standard I/O techniques. Standard I/O techniques include assertion of the read, write, and chip select signals subsumed by 212 and labeled SCSI/MPB Chip Control. Typically, the SCSI Processor 204 is programmed on a byte by byte basis by the Host Computer 18. The Host Computer can access the internal registers of the SCSI Processor 204 to program the device by asserting the Base Address signals 708 in conjunction with the SCSI/MPB Chip Control 212 signals. In this way, individual bytes of programming data can be written to the device. The MPB controller 401 can also respond to a SCSI DMA Request 207 by asserting SCSI DMA Acknowledge 208.

The Host Computer 18 will reset the SCSI controller 200 by asserting the Reset-SCSI signal 201. This signal will be asserted during a master reset power-up sequence, or upon detecting an unrecoverable error condition. The SCSI Processor 204 is able to interrupt the Host Computer 18 through the Interrupt-SCSI signal 211. Depending upon the direction of data, Interrupt-SCSI 211 can indicate to the Host Computer 18 that another device is requesting data from the SCSI Processor 204 or that another device is sending data to the SCSI Processor 204. Once the Host Computer 18 is informed, it can program the SCSI Processor to perform the requested function.

4. VIDEO COMPRESSION-EXPANSION PROCESSOR

Figure 3:
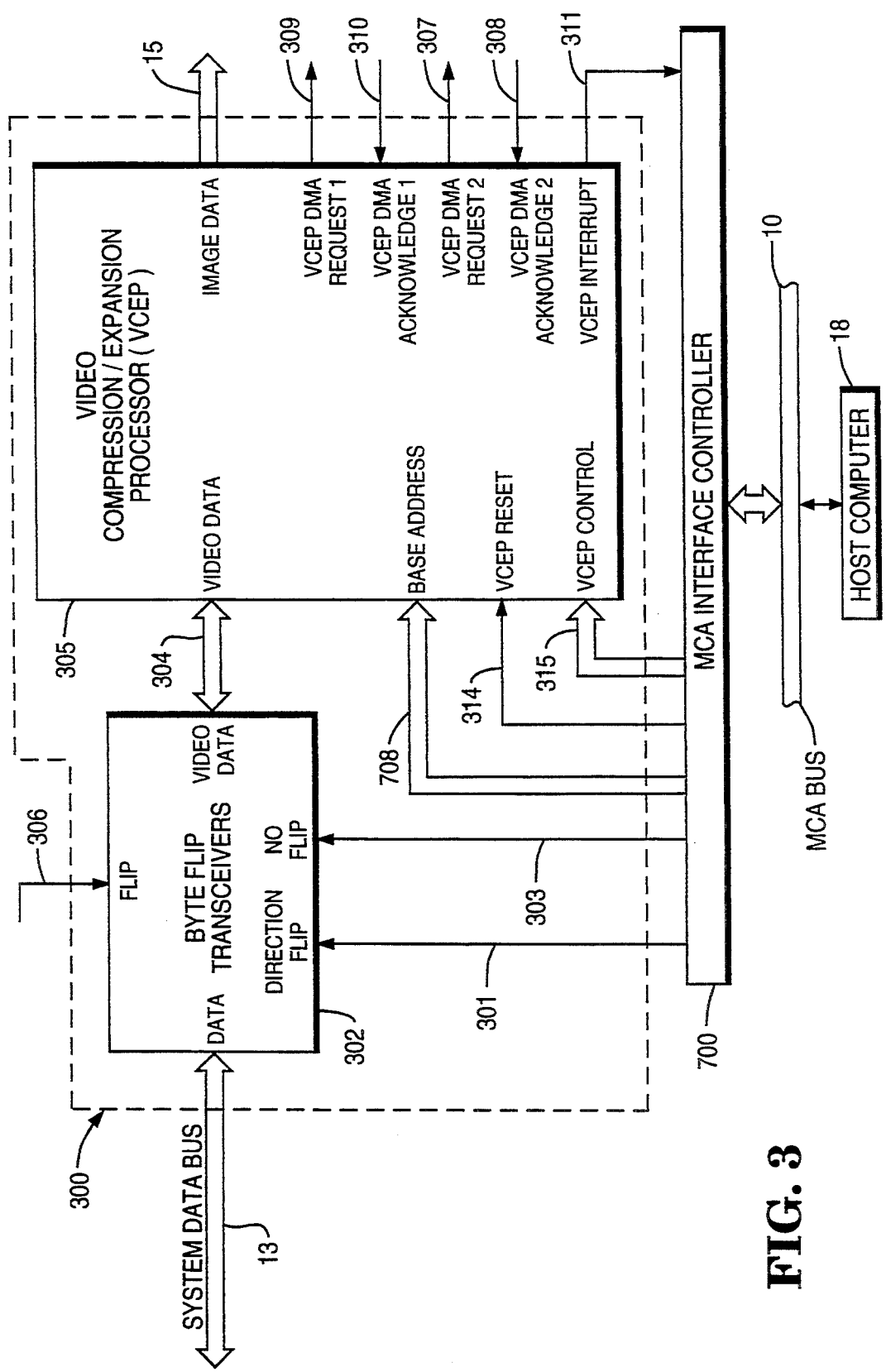
FIG. 3 is a detailed block diagram (300 of FIG. 1) of the Video Compression/Expansion Processor block including Byte-Flip Transceivers.
Figure 6:
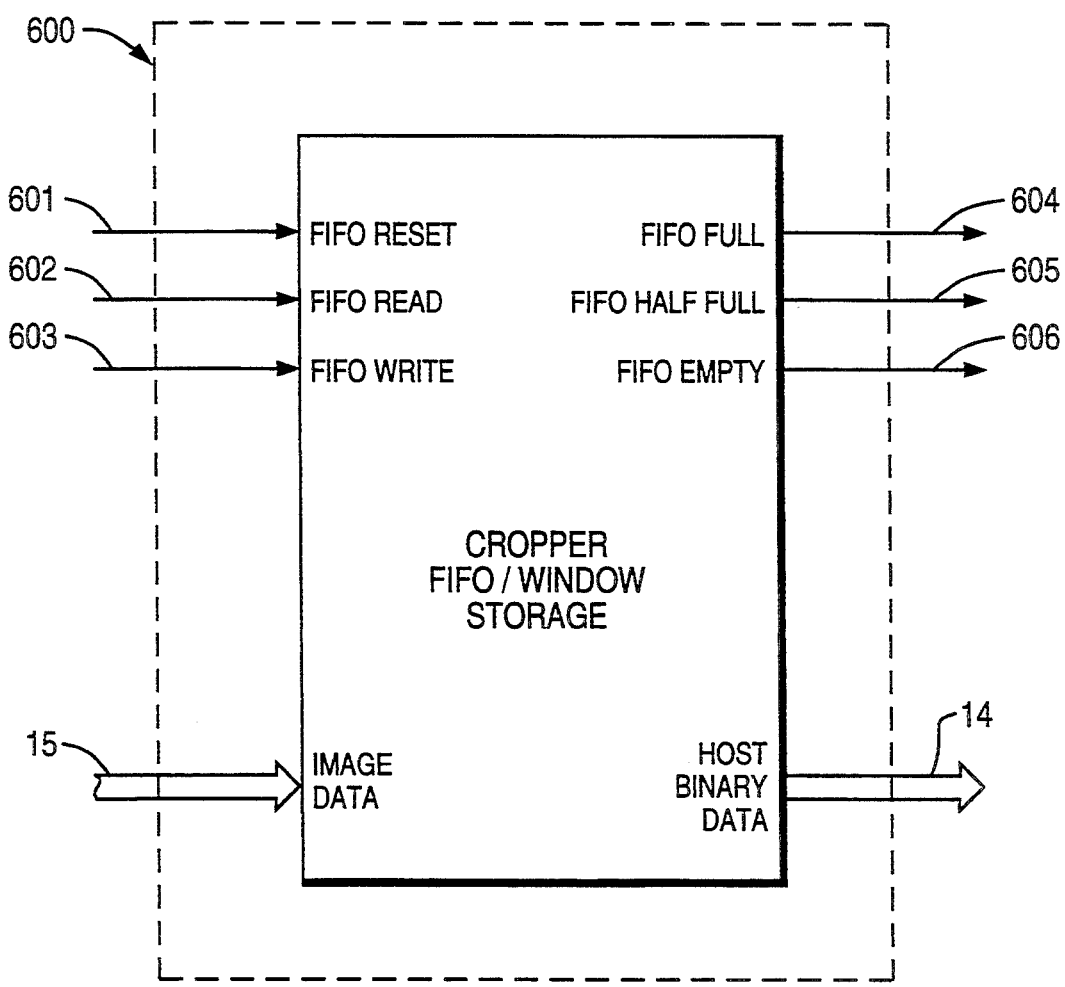
FIG. 6 is a detailed block diagram (600 of FIG. 1) of the Cropper First-In-First-Out (FIFO)/Window Storage memory.

Referring now to FIG. 3, the VCEP block 300 is comprised of the Byte-Flip Transceivers 302 and the VCEP Processor 305. The Byte-Flip Transceivers 302 manipulate data and send the data to the VCEP Processor 305 for further processing. Byte-flipping allows the VCEP 300 to process data received in any compressed data format such as Big Endian or Little Endian. In addition to the byte-flipping function, the VCEP Processor 305 performs additional processing and sends the data to the Cropper FIFO/Window Storage 600 (FIG. 6).

The VCEP 300 represents technology that is well known in art and can be readily understood by one skilled in the art. For example, the VCEP 300 can be implemented using NCR part No. 006-2003044-OTI-95C71/16.

Data transferred to the VCEP 300 can be transferred from either the MPB 12 (FIG. 1) or from the Host Computer 18. Depending upon the mode in which the VCEP Processor 305 has been programmed, it can decompress or compress the data as required, or it can simply pass the data to the Host Computer 18 in transparent mode without performing any processing. Transparent mode is useful in performing diagnostics and self-test procedures since data can be continuously recirculated among various components within the Preprocessing System 20 (FIG. 1) and can be checked for integrity by the Host Computer 18.

In the typical mode, the VCEP 300 receives a data image for processing in a compressed format such as CCITT Group 3 or Group 4. Furthermore, the Host Computer 18 can program the VCEP Processor 305 to handle a variety of data compression formats.

The Host Computer 18 programs the VCEP Processor 305 for the appropriate mode (compression, decompression, transparent mode, DMA mode, or Standard I/O mode) but once programmed in the DMA mode, the MPB Controller 401 (FIG. 1) issues the signals necessary to perform the data transfers to the VCEP 300 from the MPB 12. Note that the SCSI controller 200 (FIG. 2) can receive data at the same time that the VCEP 300 processes data. Simultaneous operation of these two components is possible since both devices share the MPB 12 (FIG. 1). Thus, when the VCEP 300 is busy processing incoming data, data received through the SCSI controller 200 (FIG. 1) can be stored in the MPB 12 (FIG. 1) until the VCEP 300 is ready to accept that data. In this way, the MPB 12 (FIG. 1) acts to synchronize and optimize the flow of data between the SCSI controller 200 (FIG. 1) and the VCEP 300.

Still referring to FIG. 3, sixteen bit data enters the VCEP 300 through the System Data Bus 13 and into the Byte Flip Transceivers 302. The Byte Flip Transceivers allow incoming data bytes to be flipped about their center. Since each sixteen bit data word is comprised of two eight bit bytes, each eight bit byte can be flipped about its center. In other words, bit 7 is transposed with bit 0, bit 6 is transposed with bit 1, bit 5 is transposed with bit 2, and bit 4 is transposed with bit 3. This function is governed by the host computer depending upon the type of data format in use and allows for greater flexibility in handling different data formats.

The Byte Flip Transceivers 302 are controlled by Direction-Flip 301 and No-Flip 303 issued by the MCA Interface Controller 700 or the MPB Controller 401 (FIG. 4) in conjunction with Flip 306 issued by the MPB Controller 401 (FIG. 4). Only data from the MPB 12 (FIG. 1) can be flipped whereas data from the Host Computer 18 cannot be flipped.

By asserting the proper combination of the above three signals, 301, 303, 306, the Host Computer 18 can perform non-flipped functions and the MPB Controller 401 (FIG. 4) can perform flipped and nonflipped functions.

The Video Data Bus 304 connects the output of the Byte Flip Transceivers 302 with the input of the VCEP Processor 305. Data entering the VCEP Processor 305 is compressed, decompressed, or passed through without modification depending upon the particular mode in which the VCEP Processor 305 has been programmed. The data output of the VCEP Processor 305 is connected to the data input of the Cropper FIFO/Window Storage 600 (FIG. 1) through the Image Data Bus 15. The VCEP Processor 305 uses DMA techniques well known in the art to receive incoming data from the MPB 12 (FIG. 1) and to transmit outgoing data to the Cropper FIFO/Window Storage 600 (FIG. 1).

When data is available from the MPB 12 (FIG. 1) for processing by the VCEP 300, the VCEP Processor 305 will be programmed by the Host Computer 18 to the desired mode of operation. This triggers a DMA data transfer request. Typically, a compressed data image residing in the MPB Buffer 12 (FIG. 1) is ready for decompression by the VCEP Processor 305. For each word of data transferred along the Video Data Bus 304, the VCEP Processor 305 will assert VCEP DMA Request 1 (309) and the MPB Controller 401 (FIG. 4) will respond by asserting VCEP DMA Acknowledge 1 (310) until all of the data in the MPB 12 (FIG. 1) has been transferred and processed.

As the VCEP Processor 305 processes the data, it will store the data in an internal output buffer. A second DMA channel is employed to transfer the data from the VCEP Processor 305 internal output buffer to the Cropper FIFO/Window Storage 600 (FIG. 6). For each word of data transferred from the VCEP Processor 305 output buffer, the VCEP Processor will assert VCEP DMA Request 2 (307) and the Cropper Controller 502 (FIG. 5) will respond by asserting VCEP DMA Acknowledge 2 (308) until all of the data has been transferred and processed.

Note that the VCEP Processor 305 can receive data from the MPB 12 (FIG. 1) through DMA techniques described above or, alternatively, it can receive data through single word data reads and data writes from the Host Computer 18 by using standard I/O techniques that are well known in the art. These standard I/O techniques are used by the Host Computer 18 in programming the device and involve assertion of the read, write, and chip select signals subsumed by 3 15 and labeled VCEP Control. The Host Computer can access the internal registers of the VCEP Processor 305 to program the device by asserting the Base Address signals 708 in conjunction with the VCEP Control signals 315. In this way, individual bytes of programming data can be written to the device.

The VCEP processor 305 will assert the VCEP Interrupt signal 311 to inform the Host Computer 18 of a number of different conditions depending upon the mode in which the VCEP Processor 305 has been programmed. Signal 311 can indicate a DMA data transfer complete or a data decompression error. Since the Host Computer 18 generally controls all of the circuits in the Preprocessing System 20 (FIG. 1), VCEP Reset 3 14 allows the Host Computer to reset the VCEP 300 during a power-up initialization sequence or upon detecting an unrecoverable error condition.

5. MULTI-PURPOSE BUFFER (MPB) AND MPB CONTROLLER 5.1 Overview:

Referring now to FIG. 4, there is shown a detailed block diagram containing the MPB 12, the MPB Controller 401, and the Main System Transceiver 16. The MPB 12 acts as interface buffer between SCSI controller 200 (FIG. 1) or the Host Computer 18 and the VCEP 300 (FIG. 1) to queue up data and synchronize data transfer speed so that continuous image preprocessing is possible. Since the VCEP 300 (FIG. 1) may not be able to process data as fast as the SCSI controller 200 (FIG. 1) can supply data, the VCEP 300 (FIG. 1) may create a processing bottleneck. The MPB 12 allows this potential bottleneck to be isolated from the SCSI controller 200 (FIG. 1) by storing the SCSI data in a first-in-first-out fashion until the VCEP 300 (FIG. 1) is ready to process more data.

The Host Computer 18 determines whether to retain control of the System Data Bus 13 or whether to relinquish control of the bus to the MPB Controller 401. If the Host Computer 18 does relinquish control of the bus to the MPB Controller 401, the MPB Controller 401 will control the simultaneous transfer of data from the SCSI controller 200 (FIG. 1) to the MPB 12 and from the MPB 12 to the VCEP 300 (FIG. 1). Additionally, the MPB Controller 401 will control the simultaneous transfer of data from the Host Computer 18 to the MPB 12 and from the MPB 12 to the SCSI Controller 200 (FIG. 1). The MPB Controller 401 implements the simultaneous transfer of data by switching System Data Bus 13 access between the SCSI controller 200 (FIG. 1) and the VCEP 300 (FIG. 1) for a period of one-half of the maximum data rate.

Still referring to FIG. 4, control of the data flow between the SCSI controller 200 (FIG. 2) and the MPB controller 401 or between the SCSI controller 200 (FIG. 2) and the MCA Interface Controller 700 is controlled by signal SCSI Direction 714 issued by the Host Computer 18. When SCSI Direction 714 is selected, the Host Computer DMA channel (MCA DMA Request1

503, FIG. 7) is connected to the SCSI DMA channel (SCSI DMA Request 207, FIG. 2). Alternatively, when SCSI Direction 714 is deselected, the Host Computer DMA channel (MCA DMA Request 1 503, FIG. 7) is connected to the cropper output and SCSI DMA Request 207 is connected to the MPB controller 401 (FIG. 4). As previously described in the section titled Small Computer System Interface (Section 3), a first DMA channel is provided so that data can be transferred directly between the SCSI controller 200 (FIG. 2) and the Host Computer 18 thus, bypassing the MPB 12 and the VCEP 300 (FIG. 3). Use of this first DMA channel involves assertion of signals SCSI DMA Request 207 and SCSI DMA Acknowledge 208. However, the SCSI DMA channel can also be used to transfer data between the SCSI controller 200 (FIG. 2) and the MPB 12 in applications which involve data preprocessing.

5.2 Multi-Purpose Buffer:

Still referring to FIG. 4, the Multi-Purpose Buffer (MPB) 12 is a 32 k by 16 bit RAM (random access memory) that is connected to the bi-directional System Data Bus 13. All data is written to and read from the MPB 12 along this sixteen bit wide bus. Data can be received by the MPB from two different sources, the SCSI controller 200 (FIG. 1), or the Host Computer 18. Once data has been received, the data can be directed to the SCSI controller 200 (FIG. 1), the VCEP 300 (FIG. 1), or the Host Computer 18.

Since the MPB is capable of accommodating 32,768 sixteen bit words (32K words) of data, fifteen address lines 402 are provided by the MPB controller 401 to fully access the memory. Signal Read/Write MPB 707 controls whether data is written into or read out of the MPB 12. Signal Output Enable/Select MPB 706 controls whether the MPB data is enabled onto the System Data Bus 13 and controls which particular memory chip within the MPB 12 is selected. Since either the MPB controller 401 or the Host Computer 18 can control the system, either device is capable of controlling signals Read/Write MPB 707, Output Enable/Select MPB 706, SCSI Direction 714, and CAB Control 712. Note that the Address signals 402 from the MPB Controller 401 to the MPB 12 are generated by the MPB Controller 401 regardless of whether the MPB Controller 401 or the Host Computer 18 have control of the system.

The MPB 12 can also be used in transferring data in the reverse direction, that is, from the Host Computer 18 to the MPB 12, and then from the MPB 12 to the SCSI controller 200 (FIG. 1). As previously stated, the MPB Controller 401 will assert signals Read/Write MPB 707, Output Enable/Select MPB 706, and CAB Control 712. When the Host Computer transmits data directly to the SCSI controller 200 (FIG. 1), the SCSI data transfer rate is limited to the transfer rate of the Host Computer 18, which is typically slower. Therefore, the SCSI usage bandwidth is reduced. Alternatively, if the entire data image file was first loaded into the MPB 12 and then sent to the SCSI controller 200 (FIG. 1) the SCSI bus bandwidth would be maximized, but the overall system data transfer rate would be lower.

To optimize the system data transfer rate, the MPB 12 is partially loaded with data by the Host Computer 18 and the SCSI data transfer is initiated. First, the Host Computer 18 transfers the data to be sent to the MPB 12 while the SCSI controller 200 (FIG. 1) concurrently removes data from the MPB 12. The MPB 12 uses the same time slicing techniques as described in Section 5.1 allowing alternate access to the MPB 12 by the SCSI controller 200 (FIG. 1) and the Host Computer 18. In this way the SCSI bus bandwidth and the overall system data rates are optimized.

5.3 Multi Purpose Buffer Controller:

As previously described above, the Multi-Purpose Buffer (MPB) 12 is used to synchronize and optimize data flow between the various components in the Preprocessing System 20 (FIG. 1). In the typical data transfer mode, the system receives a data image over the SCSI controller 200 (FIG. 1). The MPB controller 401 issues signals necessary to direct the flow of data from the SCSI controller 200 (FIG. 1) to the MPB 12 and from the MPB 12 to the VCEP 300 (FIG. 1). Additionally, in this mode, the MPB controller 401 preempts the normal flow of data between the SCSI controller 200 (FIG. 1), the MPB 12, and the VCEP 300 (FIG. 1) to allow access to those same devices by the Host Computer 18 by controlling the Main System Transceiver 16 with signals subsumed by CAB Control 712.

As previously mentioned, the MPB Controller 401 generates Address 402 signals to control the MPB 12. To utilize simultaneous read and write access to the MPB 12, the MPB Controller 401 generates two separate 15 bit addresses. One set of addresses represents a pointer for the SCSI controller 200 (FIG. 1) while the other set of addresses represents a pointer for the VCEP 300 (FIG. 1). Each address begins at zero and is incremented on each access from the respective device. Since access to the MPB 12 is multiplexed between the SCSI controller 200 (FIG. 1) and the VCEP 300 (FIG. 1), the MPB Controller 401 alternately generates the SCSI and the VCEP address to the MPB 12.

Since the Host Computer 18 has ultimate control of the system, it can individually initialize the MPB Controller 401 by asserting the Reset MPB 709 signal. Each major device in the system can be individually reset by the Host Computer at any time. However, a reset will typically occur during a power-up sequence or during detection of an unrecoverable error.

As previously described in the section titled Video Compression-Expansion Processor (Section 4), the MPB controller provides the signal Flip 306 (FIG. 3) to allow data to be bit-flipped about the center of a byte. Additionally, as described in the section titled Small Computer System Interface (Section 3), the MPB Controller 401 provides the signal Swap Control 206 to allow high and low byte swapping, and to allow coupling between the eight bit SCSI data bus 17 (FIG. 2) and the sixteen bit System Data Bus 13. The MPB Controller 401 provides these two signals under control of the Host Computer 18. The Host Computer 18 asserts signals MPB Byte Flip 702, and MPB Byte Swap 703, to inform the MPB Controller 401 of the preprocessing function that is to be performed.

Still referring to FIG. 4, the MPB controller 401 provides the signal Interrupt MPB 715 to the Host Computer 18 to indicate several different conditions: 1) the MPB 12 has been filled beyond capacity and data has been lost, 2) the MPB 12 had been emptied below capacity and data is invalid, and 3) the MPB 12 is empty. These interrupts are nested and prioritized in the order listed.

The MPB Controller 401 is not a hard wired microprocessor device, but rather, it is a logic cell array (LCA) TM device. LCA TM devices are comprised of a multiplicity of general purpose logic gates and logic functions that are programmed after power-up by the Host Computer 18. Once programmed, the LCA TM devices function as described above. Prior to programming, the inputs and outputs of all LCA TM devices are in a tri-state condition. Since LCA TM devices are fully programmable, modifications to the system can be accomplished by changing the LCA TM programming instead of by modifying the hardware or the circuit board.

Figure 5:
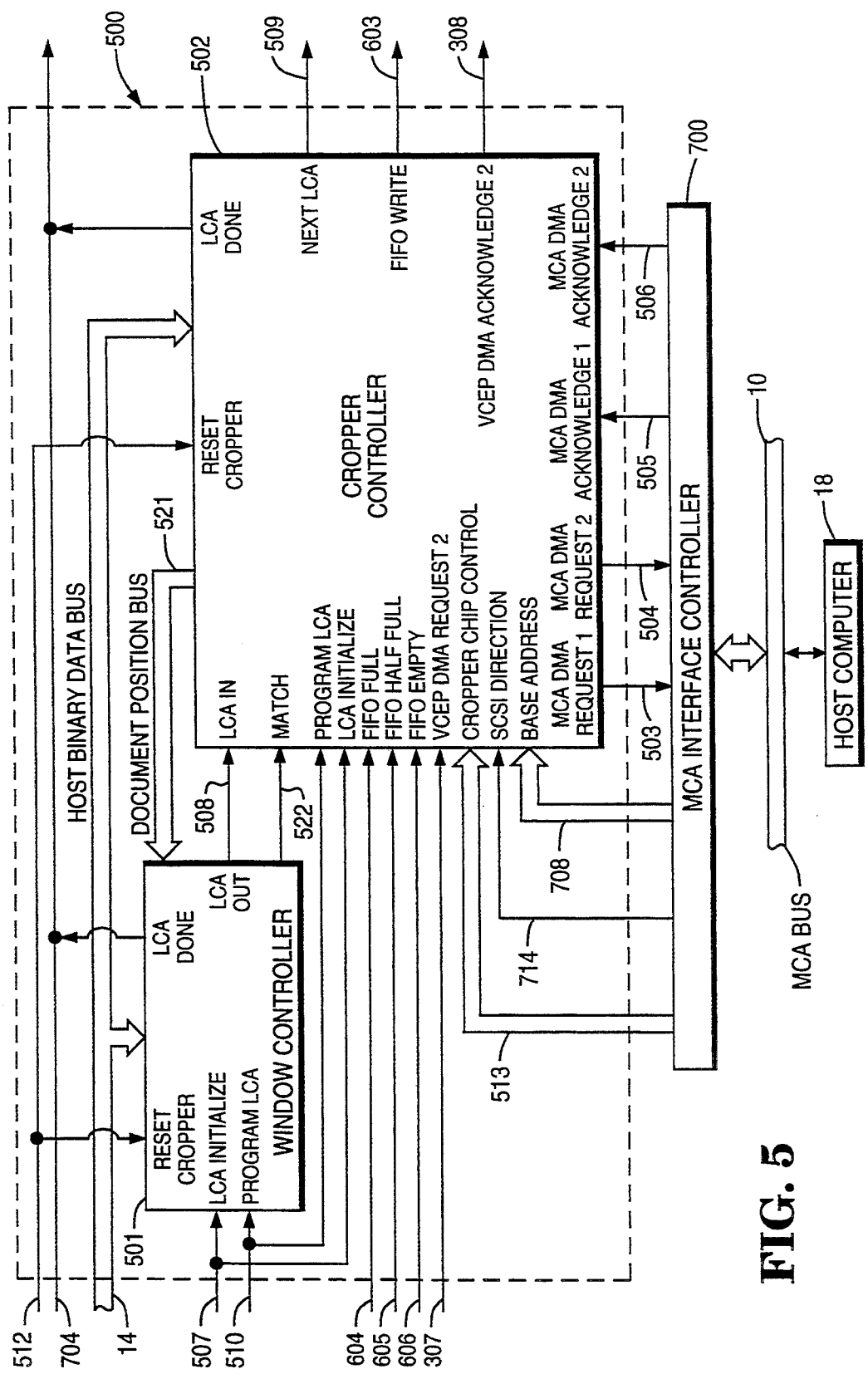
FIG. 5 is a detailed block diagram (500 of FIG. 1) of the Cropper Controller and Window Controller circuitry.

The system contains three LCA TM devices: the MPB Controller 401, the Window Controller 501 (FIG. 5), and the Cropper Controller 502 (FIG. 5). Each device is programmed upon power-up using the signals Program LCA 510 (FIG. 5), LCA Initialize 705, LCA Done 704, Next LCA 509, and LCA Out 508 (FIG. 5). The Host Computer 18 will then wait for all three LCA TM devices to deassert signal LCA Initialize 705. This indicates that each of the three devices are ready for a configuration program to be loaded. The Host Computer will first send a stream of byte wide configuration data to the Window Controller 501 (FIG. 5) and will assert Program LCA 510 (FIG. 5). The Window Controller 501 (FIG. 5) will accept only its portion of the configuration data. Once the Window Controller 501 (FIG. 5, first LCA TM device) has been fully programmed it will continue to accept the byte wide configuration data sent by the host but it will serialize the data and retransmit the serial configuration data to the Cropper Controller 502 (FIG. 5) along serial line LCA Out 508 (FIG. 5). Once the Cropper Controller 502 (FIG. 5, second LCA TM device) has been completely loaded with its portion of the serial configuration data, the Cropper Controller 502 (FIG. 5) will pass subsequent serial configuration data to the MPB Controller 401 as the last device on the chain using signal Next LCA 509. In this manner, all three LCA TM devices are sequentially programmed by the Host Computer 18.

All three LCA TM devices are connected to the LCA Done signal 704 in a dot-or (open collector or open drain) mode such that the signal can only be asserted when all three LCA TM devices have been fully programmed. When the Host Computer 18 receives the LCA Done signal 704, programming terminates.

5.4 Main System Transceiver:

Still referring to FIG. 4, the Main System Transceiver 16 essentially couples the Host Binary Data Bus 14 with the System Data Bus 13. This transceiver 16 is a bi-directional tri-state buffer which is controlled by either the MPB Controller 401 or the Host Computer 18 depending upon which device has control of the system. When the MPB Controller 401 has control of the System Data Bus 13 it will assert CAB Control 712 to direct the flow of data. CAB Control 712 subsumes individuals signals such as chip enable, output enable, and clock control. When the Host Computer 18 has control of the System Data Bus 13 the Host Computer 18 will control the same signals.

By coupling the Host Binary Data Bus 14 and the System Data Bus 13, any data coming from the SCSI controller 200 (FIG. 1), the MPB 12, or the VCEP 300 (FIG. 1) can be read on to the Host Binary Data Bus 14 for subsequent transfer to the Host Computer 18. Similarly, any data from the Host Computer 18 can be sent to the SCSI controller 200 (FIG. 1), the MPB 12, or the VCEP 300 (FIG. 1) by asserting the signals subsumed by CAB Control 712.

6. CROPPER

6.1 Cropper Overview:

Referring now to FIG. 5, the Cropper 500 is comprised of the Window Controller 501, the Cropper Controller 502, and the Cropper FIFO/Window Storage 600 (FIG. 6). The function of the Cropper Controller 502 is to cut out or crop up to two programmable windows of data from a stored data image and to save those two cropped images in separate Cropper FIFO/Window Storage 600 (FIG. 6) areas. The Window Controller 501 performs the data window comparisons and informs the Cropper Controller 502 when to crop data and store it in the Cropper FIFO/Window Storage 600 (FIG. 6).

The Cropper Controller 502 controls data retrieved from the VCEP 300 (FIG. 1) and data stored in the Cropper FIFO/Window Storage 600 (FIG. 6). Typically, a data image file received by the SCSI controller 200 is large (150 kbytes uncompressed). However, only a small portion of that file is usually needed for final processing. The Cropper 500 provides the ability to store two cropped windows from the large image data file.

The Cropper Controller 502 can operate in either transparent mode or in crop mode. In transparent mode, the entire stored image is sent from the VCEP 300 (FIG. 3) to the first Cropper FIFO 600 (FIG. 6) while the second Cropper FIFO (FIG. 6) receives no data. In crop mode, each of the two independent windows may be as small as 16 bits by 1 bit or may be as large as the entire image (32 k by 16) and may even overlap.

The major advantage of the Cropper circuitry is that the amount of data transferred to the Host Computer 18 is significantly reduced. Instead of transferring the entire data image to the Host Computer, as done in prior art recognition systems, only the required section of the data is passed, thus, reducing the work load of the Host Computer 18. This has two major benefits. First, the Host Processor 18 has more time to devote to other processing tasks. Second, the Host Computer 18 can process the portion of data passed to it from the Cropper FIFO/Window Storage 600 (FIG. 6) even before the VCEP 300 (FIG. 3) has finished decompressing the entire data image file. Thus, VCEP 300 (FIG. 1) processing can be aborted and a large portion of the data image file can be discarded once the necessary window data has been received by the Host Computer 18. The Image Preprocessing System 20 can then begin to process the next compressed file thereby improving overall system throughput.

6.2 Cropper Controller:

Still referring to FIG. 5, image data which has been processed (compressed, decompressed, or passed-through) by the VCEP Processor 305 (FIG. 3) is sent to the Cropper FIFO/Window Storage 600 (FIG. 6) along the sixteen bit wide Image Data Bus 15 while under direct control of the Window Controller 501 and the Cropper Controller 502. The output of the Cropper FIFO/Window Storage 600 (FIG. 6) is connected to the Host Binary Data Bus 14 and final processed data residing in the Cropper FIFO/Window Storage 600 (FIG. 6) is sent to the Host Computer 18 along this bus.

Before the Cropper 500 can process data, the mode and window information must be programmed. The Host Computer 18 will access the Cropper Controller 502 through the MCA Interface Controller 700 using signals Base Address 708 and Cropper Chip Control 513. This allows the window coordinates for the two windows to be cropped to be programmed into the device.

The Cropper Controller 502 uses signals VCEP DMA Request2 307 and VCEP DMA Acknowledge2 308 to retrieve data from the VCEP 300 (FIG. 1). Data is retrieved when signal VCEP DMA Acknowledge2 308 is activated by the Cropper Controller 502. If the Cropper Controller 502 determines that data retrieved needs to be stored in the Cropper FIFO/Window Storage 600 (FIG. 6), the Cropper Controller 502 activates signal FIFO Write 603 and VCEP DMA Acknowledge2 308 simultaneously, thus, effectively transferring the data from the VCEP 300 (FIG. 1) to one or both of the Cropper FIFO/Window Storage 600 (FIG. 6) devices.

To determine whether data received from the VCEP 300 (FIG. 1) lies within a preprogrammed window, the Cropper 500 counts the number of word transferred from the VCEP 300 (FIG. 1). The current count of the number of words transferred is then compared with internal window count registers. If a match is found with either of the two window coordinates, the data is stored in the appropriate FIFO 600. When the Cropper Controller 502 has been programmed in transparent mode, all data transferred from the VCEP 300 (FIG. 1) is stored in the FIFOs 600.

The Cropper FIFO/Window Storage 600 devices (FIG. 6) can only store 512 words (16 bit words). However, this does not limit the window size. The Cropper Controller 502 monitors the status of the two Cropper FIFO/Window Storage devices 600 (FIG. 6) to determine when the FIFOs are half full. When signal FIFO Half Full 605 is activated, the Cropper Controller requests a DMA transfer from the MCA Interface Controller 700. The Cropper Controller 502 will assert either MCA DMA Request1 503 or MCA DMA Request2 504 and the MCA Interface Controller 700 will respond by asserting MCA DMA Acknowldege1 (505) or MCA DMA Acknowldege2 (506). In response to the acknowledge signals, the Cropper Controller 502 generates the appropriate signals. This will effectively transfer data from the Cropper FIFO/Window Storage 600 devices (FIG. 6) to the Host Computer 18. If the Host Computer 18 does not remove data fast enough from the Cropper FIFO/Window Storage 600 devices (FIG. 6) and the devices become full, the Cropper FIFO/Window Storage 600 devices (FIG. 6) will assert the signal FIFO Full 604. In response to FIFO Full 604, the Cropper Controller 502 will suspend any further data transfers from the VCEP 300 (FIG. 1) to allow the Host Computer to unload the FIFO data. When the FIFOs are no longer full, the data transfer will resume.

6.3 Window Controller:

Still referring to FIG. 5, the Window Controller 501 compares the Data Document Position Bus 521 with the positions which have been previously programmed into the window coordinate registers of the Window Controller 501 to determine whether the current position is located within one or both windows. The Window Controller 501 then asserts signal Match 522 to indicate to the Cropper Controller 502 that a match has occurred.

Each set of window coordinates contain four pieces of information which uniquely define each window. The Host Computer 18 supplies the X and Y coordinate position of the upper left corner of the window and the X and Y coordinate position of the lower right corner of the window. The Cropper Controller 502 generates an X counter and a Y counter to track the current position the image data as the data is removed from the VCEP Processor 305 (FIG. 3) The Cropper Controller 501 outputs the current position to the Window Controller 501 over the Data Document Position Bus 521

6.4 Cropper FIFO/Window Storage:

Referring now to FIG. 6, there is shown a block diagram of the Cropper FIFO/Window Storage device 600 that stores cropped window data. Although shown as a single block, the Cropper FIFO/Window Storage 600 contains two fully independent memory devices, each of which is controlled by the Cropper Controller 502 (FIG. 5) and the Host Computer 18. For each separate FIFO, the Cropper Controller 502 (FIG. 5) generates the signal FIFO Write 603. To write data into the FIFO 600, the Cropper Controller 502 (FIG. 5) asserts FIFO Write 603. To read data out of the FIFO on to the Host Binary Data Bus 15, the MCA Interface Controller 700 asserts FIFO Read 602. Additionally, the Host Computer 18 can assert FIFO Reset 601 during a power-up sequence or upon detection of an unrecoverable error condition. That will clear all data from both Cropper FIFO/Window Storage 600 devices (FIG. 6).

Each Cropper FIFO 600 provides the Cropper Controller 502 (FIG. 5) with the following signals: FIFO Full 604, FIFO Empty 606, and FIFO Half Full 605. FIFO Full 604 indicates that the FIFO cannot accept any more data and that the Cropper Controller 502 (FIG. 5) must stop any further data transfer. Similarly, FIFO Empty 606 indicates that the FIFO contains no data. FIFO Half Full 605 indicates that one half of the FIFO's capacity has been utilized. Upon detection of the FIFO Half Full 605 signal, the Cropper Controller 502 (FIG. 5) issues an MCA DMA Request½ (503/504). This signals the Host Computer 18 to begin removing data from the FIFOs 600 (FIG. 6), thus, allowing more window data to be saved into the Cropper FIFOs 600 (FIG. 6). In this way a large data image file is continuously processed by the VCEP 300 (FIG. 3), cropped by the Cropper Controller 502 (FIG. 5), stored into the Cropper FIFO/Window Storage 600, and periodically transferred to the Host Computer 18. Since data received from the VCEP 300 (FIG. 3) and subsequently cropped is essentially buffered by the FIFO/Window Storage, the VCEP 300 (FIG. 3) processing (decompression) rate is not limited to the rate at which the host can remove the decompressed/cropped data from the FIFO/Window Storage 600.

6.5 FIFO to Host Computer Data Transfer:

Still referring to FIG. 5, two independent DMA channels exist to transfer data from each Cropper FIFO 600 (FIG. 6) to the Host Computer 18. Again, these DMA techniques are well know in the art and are easily understood by one skilled in the art. When data is ready to be transferred from the Cropper FIFO/Window Storage 600 (FIG. 6) to the Host Computer, the Cropper Controller 502 will be programmed by the Host Computer 18 to request a DMA data transfer by asserting MCA DMA Request1 503 or MCA DMA Request2 504. The MCA Interface Controller 700 will eventually respond by asserting MCA DMA Acknowledge 1 505 or MCA DMA Acknowledge2 506 and FIFO Read 602 until all of the data has been transferred from the respective FIFO 600 (FIG. 6) to the Host Computer 18.

7. MCA INTERFACE CONTROLLER:

Referring to FIG. 7, the MCA Interface Controller is a standard device well known in the art and is easily understood by one skilled in the art. For a more complete reference see *Standard MicroSystems Corp MCI94C 18A.*

The Host Computer performs all of the initial programming of the system and has ultimate control over all components in the system. Upon a power-up sequence, the Host Computer 18 will reset and program all components in the system and will control the flow of data through the system depending upon the application involved. The Host Computer 18 sends and receives signals over the MCA Bus 10 which is connected to the MCA Interface Controller 701. All signals provided to and asserted by the MCA Interface Controller 700 have been described in the above specification in the appropriate block description.

8. LOW COST FLEXIBLE POPULATION MODE

Referring to FIG. 1, a low cost flexible mode of population allows for the selective population of components on the Preprocessing System 20. By populating only the SCSI controller 200, the MCA Interface Controller 700, and the Main System Transceivers 16, a low cost data communications link without image preprocessing capability is provided. This cost efficient simple data communications link will receive external data across a Differential Data Bus 202 and pass it directly to the Host Computer 18 through the Main System Transceiver 16 and the MCA Interface Controller 700. The Main System Transceiver 16 functions identically regardless of whether the low cost flexible population mode or the complete Image Preprocessing System 20 is realized.

It can thus be seen that there has been provided by the present invention an image preprocessing system which receives digital image data from a data communications link and processes the data in accordance with direction from the host computer. Selective portions of the image data are cropped and processed by the system prior to transmission to the host computer, thus, reducing the computational workload of the host computer.

Although the presently preferred embodiment of the invention has been described, it will be understood that various changes may be made within the scope of the appended claims. In the described embodiment, the invention is implemented on a single board capable of installation in a Micro Channel host personal computer system. Additionally, any suitable data communications link may be used to connect the system to various image capture platforms. However, the present invention is not limited to the described embodiment.

What is claimed is:

1. A high speed digital image preprocessing system connected between a data link and a host computer interface bus, said high speed digital image preprocessing system comprising:
    a digital multi-purpose buffer for storing digital image data, said digital image data being comprised of a plurality of digital image words;
    a video processor connected to receive said digital image data from said digital multi-purpose buffer;
    a data link interface controller to direct a flow of said digital image data to and from said data link;
    a multi-purpose buffer controller for providing signals to control the flow of said digital image data between said digital multi-purpose buffer, said data link, said video processor, and said host computer interface bus;
    a data cropping controller connected to receive a plurality of preprogrammed window coordinates such that said digital image data processed by said video processor which matches the preprogrammed window coordinates is identified;
    a host computer interface means to direct the flow of said digital image data to and from said host computer interface bus; and
    a window data storage means connected to receive said identified digital image data from said video processor and connected to send said identified digital image data to said host computer interface bus.

2. The system as recited in claim 1 wherein said digital multi-purpose buffer is connected between said data link and said video processor such that said multi-purpose buffer stores the digital image data received from said data link and supplies the digital image data to the video processor as requested by the video processor, thus allowing for a continuous processing of said image data by the video processor.

3. The system as recited in claim 1 wherein said mutli-purpose buffer controller provides a first shared direct memory access (DMA) data channel to transfer said digital image data between said multi-purpose buffer and said data link and between said multi-purpose buffer and said host computer interface, and additionally provides a second DMA data channel to transfer said digital image data between said multi-purpose buffer and said video processor simultaneously with the transfer of said digital image data between said multi-purpose buffer and said data link.

4. The system as recited in claim 3 wherein said video processor provides a third direct memory access data channel to transfer said digital image data from said video processor to said window data storage means.

5. The system as recited in claim 1 wherein said video processor compresses and decompresses said digital image data received from said digital multi-purpose buffer and is connected to transfer said digital image data to said window data storage means.

6. The system as recited in claim 4 wherein said video processor includes means for passing said digital image data received thereby directly to said window data storage means.

7. The system as recited in claim 1 wherein:
    each of said digital data words includes a high byte and a low byte; and
    said multi-purpose buffer controller includes means for byte ordering said digital image words by juxtaposing the high byte with the low byte of said digital image word.

8. The system as recited in claim 1 wherein:
    each of said digital data words includes at least one byte, said byte comprising a plurality of bits; and
    said multi-purpose buffer includes means for byte flipping said digital image words by juxtaposing the bits of each byte of said digital image word about the center of each said byte.

9. The system as recited in claim 1 wherein said multi-purpose buffer controller includes means for generating signals to said host computer interface means to indicate when said digital image buffer is empty and when the digital image buffer is full.

10. The system as recited in claim 1 wherein said window data storage means includes means for generating signals to said data cropping controller to indicate when said window data storage means is empty, full, and half full.

11. The system as recited in claim 1 wherein said data cropping controller receives said preprogrammed window coordinates which overlap in area.

12. The system as recited in claim 11 wherein said preprogrammed window coordinates are at least one bit by sixteen bits but no larger than the maximum capacity of said multi-purpose buffer.

13. The system as recited in claim 1 wherein said window data storage means is connected to receive said digital image data cropped by said data cropping controller, said window data storage means further comprises a plurality of independent first-in first-out buffers (FIFO).

14. The system as recited in claim 13 further comprising a forth and fifth direct memory access data channel to transfer said digital image data from each said independent FIFO to said host computer interface means respectively.

15. The system as recited in claim 1 wherein said data link comprises a Small Computer System Interface (SCSI).

16. The system as recited in claim 1 wherein said multi-purpose buffer controller provides signals to control the flow of said digital image data between said digital multi-purpose buffer, said data link, said video processor, and said host computer interface bus to facilitate bi-directional data flow to and from said multi-purpose buffer at rates supporting maximum transfer rates of said data link and video processor.

* * * * *